Dec. 1, 1953  L. G. HOENER  2,661,071
MOTOR VEHICLE SPEED CONTROL
Filed June 30, 1950  2 Sheets-Sheet 1
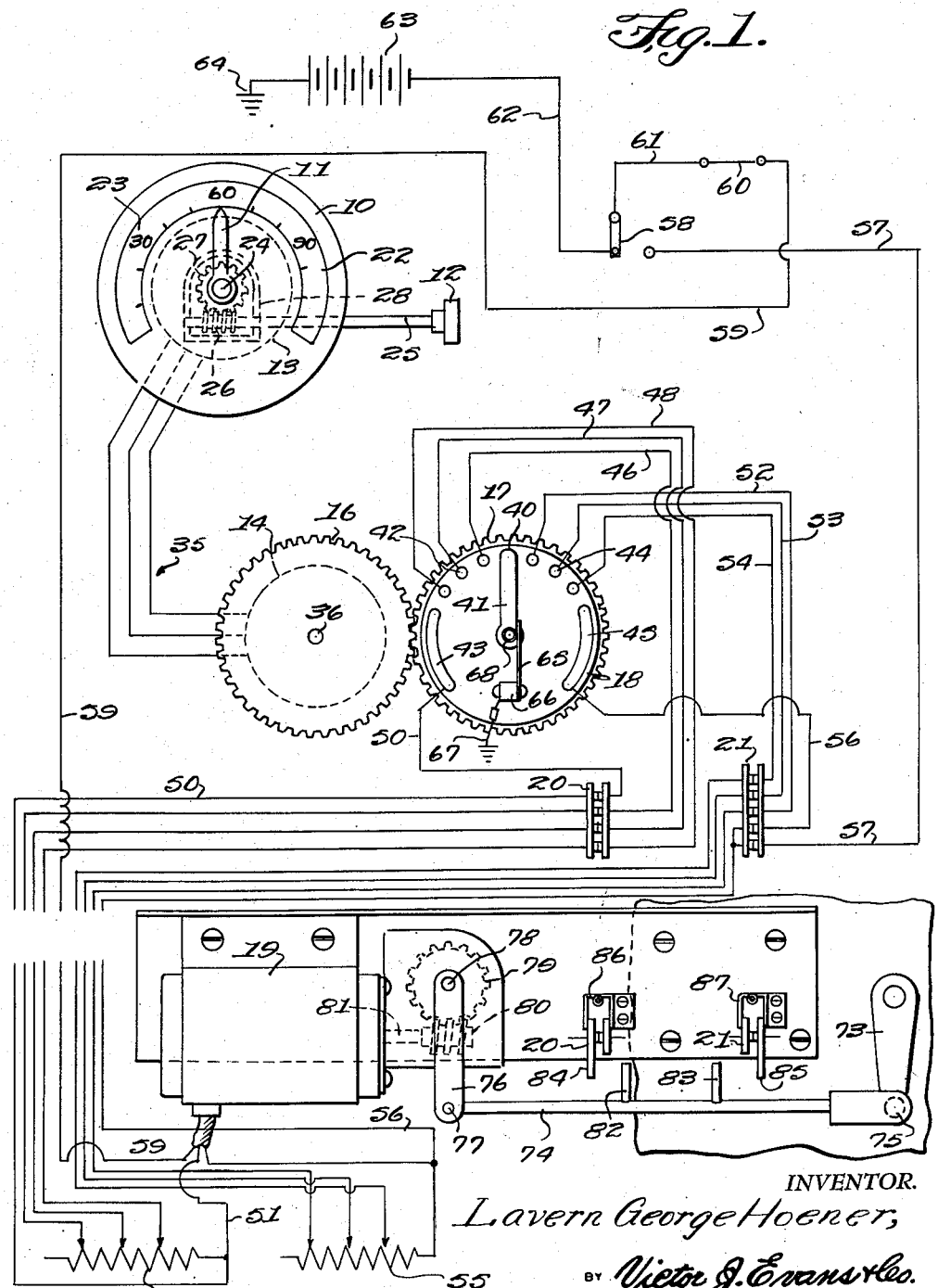
INVENTOR.
Lavern George Hoener,
BY Victor J. Evans & Co.
ATTORNEYS Dec. 1, 1953         L. G. HOENER         2,661,071
MOTOR VEHICLE SPEED CONTROL
Filed June 30, 1950         2 Sheets-Sheet 2
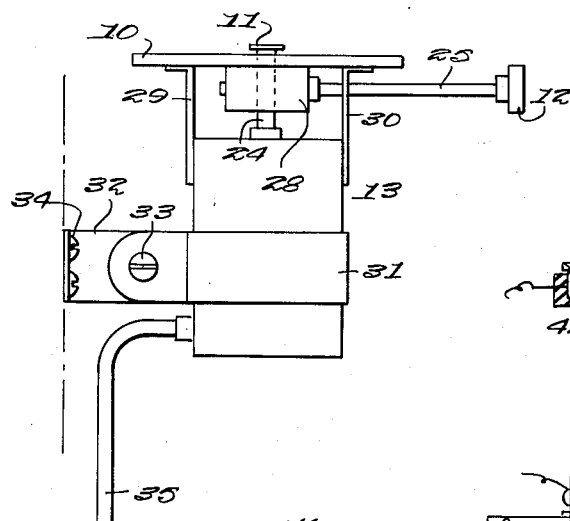
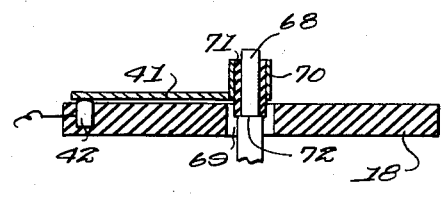
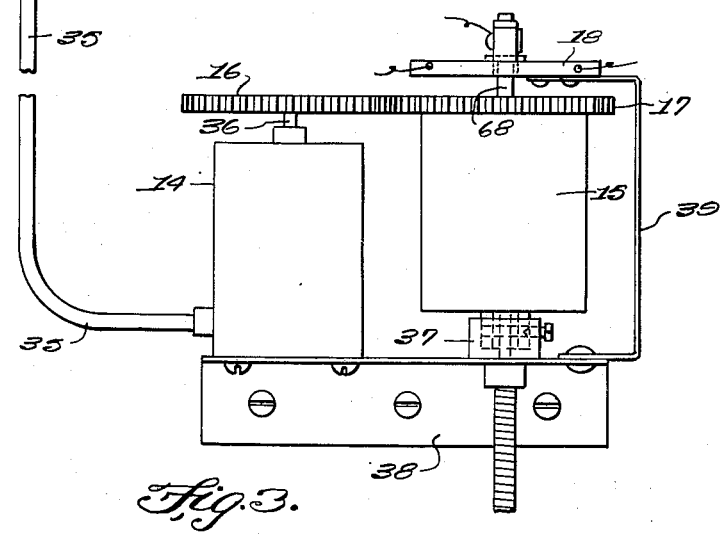
INVENTOR.
Lavern George Hoener,
BY *Victor J. Evans & Co.*
ATTORNEYS Patented Dec. 1, 1953

2,661,071

UNITED STATES PATENT OFFICE 2,661,071

MOTOR VEHICLE SPEED CONTROL

Lavern George Hoener, East Chicago, Ind.

Application June 30, 1950, Serial No. 171,294

6 Claims. (Cl. 180—82.1)

1

This invention relates to speed control devices used in combination with speedometers and accelerator pedals for motor vehicles, and in particular this invention relates to a governor or speed control device in which the arm of a butterfly or control valve of a carbureter is actuated by a motor and manually set variable resistors in combination with limit switches are provided to control the movement of the arm, the said limit switches being combined with the speedometer and connected with a plurality of circuits for both forward and reverse to the carbureter control arm acutating motor.

The purpose of this invention is to provide a motor vehicle speed control device in which means is provided for compensating for hill climbing and also in which the device may be used in combination with a foot accelerator pedal or may be installed to replace the accelerator pedal.

The speed control device of this invention may also be used on vehicles with or without a clutch and when used in combination with the foot accelerator pedal it functions similar to the hand control throttle.

In the conventional type of speed control where the movement of the accelerator pedal is limited it is difficult to compensate for hill climbing and the speed of the vehicle is consequently retarded. With this thought in mind this invention contemplates a control device that is manually set to desired speeds and which operates a motor to adjust the position of the carbureter control valve accordingly.

The object of this invention is, therefore, to provide means for constructing a speed control device whereby the foot accelerator pedal is eliminated and the speeed is adjusted by manually turning a button.

Another object of the invention is to provide an improved speed control device that may readily be installed on vehicles now in use.

A further object of the invention is to provide an improved motor vehicle speed control device which is of a comparatively simple and economical construction.

With these and other objects and advantages in view the invention embodies a speed control device having a manually actuated needle or pointer journaled in a dial having speed indicating numerals thereon with a speedometer rotatably mounted in combination with and geared to the pointer, a stationary disc having a plurality of contacts positioned to be engaged by the needle of the speedometer, a motor geared to a

2 control valve arm of a carbureter and actuated through circuits of the contacts of the discs, and means breaking the circuit for limiting the movement of the carbureter control valve arm.

Other features and advantages of the invention will appear from the following description taken in connection with the drawings wherein:

Figure 1 is a diagrammatic view illustrating the relative positions of the parts with the circuits for connecting the contacts of the setting discs to a motor geared to the carbureter control valve arm, as shown in Fig. 5.

Figure 2 is a side elevational view showing the speed setting and indicating device.

Figure 3 is a side elevational view showing a revolving speedometer in combination with a motor contact disc and operating elements corresponding with the element upon which the indicator is mounted and arranged to operate therewith.

Figure 4 is a cross section through the contact disc for controlling circuits to the motor that actuates the control valve of the carbureter.

Figure 5 is a diagrammatic view illustrating a motor connected to a carbureter throttle valve arm with means for opening circuits to the motor and with the circuits to the motor corresponding with the circuits of Figure 1.

Referring now to the drawings wherein like reference characters denote corresponding parts the motor vehicle speed control device of this invention includes a speed indicating disc 10 having a pointer 11 thereon controlled by a button 12 and positioned at the end of the control cylinder commonly known as a Selsyn and indicated by the numeral 13, a similar control element 14 geared to a speedometer 15 by gears 16 and 17, a stationary contact disc 18, a reversible motor 19 and circuit opening switches 20 and 21.

The indicator 10 is provided with a graduated scale 22 having numerals 23 thereon indicating miles per hour and the pointer 11 is mounted on a shaft 24 that is rotated by the button 12 through a stem 25, a worm 26 and a worm gear 27. The gears are mounted in a suitable casing 28 on the under surface of the indicator 10 and the indicator is suspended from the element 13 by brackets 29 and 30.

The element 13 is mounted in a clamp 31 that may be attached, by a bracket 32 to the instrument board of the vehicle, or to the steering wheel post, or it may be mounted on any suitable part of the vehicle. The clamp 31 is attached to the bracket 32 by a screw 33 and the bracket may be mounted by screws 34.

The element 13 is connected to the element 14 by a plurality of wires in a cable 35 and the gear 16 is carried by a shaft 36 extended from the element 14 whereby the gear rotates with the pointer 11 and consequently rotates the speedometer 15 through the gear 17.

The speedometer 15 is journaled in a bearing 37 which is mounted on a bracket 38 that may be positioned at any suitable point in the vehicle and the stationary disc 18 is suspended from the bracket 38 by a U-shape bracket 39.

The disc 18 is provided with a neutral position 40 in which a contact arm 41 is positioned in Figure 1. The disc 18 is stationary and the arm 41 travels over the surface of the disc to engage contacts thereon. The disc 18 is provided with three short contacts for forward speed, as indicated by the numeral 42 and one elongated contact 43 also for forward travel and on the opposite side of the neutral point contacts 44 and 45 are provided for reverse.

The contacts 42 are connected by wires 46, 47 and 48 to corresponding points on a variable resister 49 and the contact 43 is connected by a wire 50 directly to the motor through a connecting wire 51. The wires from the contact disc to the motor are connected through the limit switch 20 which mechanically breaks the circuit when the components 76, 74, and 73 are in a position corresponding to wide open throttle. This is merely a safety device; inasmuch as, the carburetor may be wide open before the speed of the car has reached the indicated speed of indicator 11.

The contacts 44 on the reverse side of the contact disc are connected by wires 52, 53 and 54 to the variable resister 55 and the contact 45 is connected directly through a wire 56 to the motor. The reverse side of the motor is also provided with a wire 57 that extends directly to the selector switch 58 whereby a rapid deceleration circuit is provided for closing the control valve of the carbureter. These wires of the reverse circuit of the motor are also connected through a limit switch, as indicated by the numeral 21, whereby the circuit to the motor is broken when the carburetor is fully closed and the speed of the car has not decreased to the lower setting of indicator 11.

The control circuits from the contact disc 18 are connected to the forward and reverse terminals of the motor, respectively and the ground side of the motor is connected by a wire 59 to the ignition switch 60 of the vehicle and from the ignition switch through a wire 61 to the selector switch, which is connected by wires 62 to a battery 63, the opposite terminal of which is connected to a ground 64.

The contact arm 41 of the contact disc 18 is connected to a ground through the contacts 65, the post 66 and the connection 67. The contact 65 engages the shaft 68 which extends from the speedometer and which extends through an opening 69 in the contact disc 18 as shown in Figure 4. The arm 41 is carried by a hub 70 that is positioned on an insulating sleeve 71 and the lower end of the sleeve 71 rests upon a shoulder 72 spaced from the upper end of the shaft.

The motor 19 actuates the arm 73 of the control valve of the carbureter through a rod 74 which is pivotally connected to the lower end of the arm 73 by a pin 75 and to a bar 76 by a pin 77, the arm 76 being mounted on a shaft 78 of a gear 79 that meshes with a worm 80 on a shaft 81 of the motor. The rod 74 is provided with projections 82 and 83 that are positioned to engage extending ends 84 and 85 respectively of the stationary limit switches 20 and 21 whereby with the limit switches positioned at the extreme end of the travel of the rod 74 the motor and movement of the throttle valve will stop when the switches are opened.

The limit switch 20 is provided with contact bars suspended by a spring hinge 86 and the switch 21 is provided with contact bars suspended by a similar spring hinge 87.

With the parts arranged in this manner the pointer 11 is set by the button 12 to the desired speed which, as illustrated in Figure 1 is 60, and as the pointer is set the control elements 13 and 14 actuate the gear 16 accordingly which rotates the speedometer and as the speedometer is rotate the arm 41 passes over the stationary contact disc 18 to a position corresponding with that required to actuate the vehicle to the speed of 60 miles per hour. With the parts set in this manner the motor 19 actuates the arm 73 to a position corresponding with the speed and with the limit switches 20 and 21 connected in all circuits the motor 19 stops when the arm 73 reaches the end of its travel. For city use the speed may be set to 20 or 30 miles per hour and for traveling on highways it may be set to a greater number of miles per hour, however, the limit switches are positioned beyond the range of speed with the switch at one end corresponding to the closed position of the fuel feed or throttle valve and with the switch at the opposite end beyond high speed, thereby preventing excessive travel of the parts and preventing damage to the device and vehicle.

The motor actuating the arm of the carbureter control valve is operated at four different speeds for acceleration and at four different speeds for deceleration or in reverse controlled by five circuits. The fifth circuit provides for rapid deceleration when the brakes of the vehicle are applied or when quick stopping is desired.

With the switch 60 connected to the ignition switch the circuit is open when the ignition is turned off.

The "selsyn" includes parts 13, 35 and 14. Indicator 11 moves the same arc degrees and same direction as 16, and also the same arc degrees but in the reverse direction as the movable speedometer 15. The desired speed indicated by pointer 11 will always coincide with the neutral point 40 on the stationary disc 18. Figure 1 shows desired speed of 60. 60 M. P. H. on speedometer 15 is at neutral point 40, speedometer needle in Fig. 1 is on 60 M. P. H. Car is traveling 60 M. P. H. If the speed of the car falls below the desired speed indicated by 11, 41 revolves to contact 42 for instance, motor 19 is energized to open throttle until speedometer needle 41 moves back to neutral contact 40. If the speed then goes over that desired, contacts are made which close the throttle a little. Whenever 41 is off neutral point 40, motor 19 will be energized accordingly. There are no dead spaces between energizing contacts. If indicator is moved to 30 M. P. H. desired speed, 16 and 15 are revolved the same number of arc degrees but in reverse directions. Disc 18 remains stationary.

At this setting speedometer needle 41 is pointing in the general direction of the terminal 46 in the figure indicating 30 M. P. H. on speedometer, and 15 coincides with stationary point 40. Speedometer needle 41 makes contact with 44 and energizes motor 19 to close throttle. Motor continues to close throttle at various speeds denoted by various contacts 44 and 45 until either the motor operating circuit is opened by 83 against 85 or is broken by 41 arriving at neutral point 40. As long as the speed of the car as indicated by 41 is the same as the desired speed indicated by 11, the motor will not be energized and the rod 74 will hold the throttle in the same position. When the car is traveling at the speed indicated by 11 at any setting, speedometer needle 41 will always be in the position as shown in Fig. 1, resting on neutral point 40.

A special contact corresponding to 100 M. P. H. setting of indicator 11 could be installed to energize motor 19 in such a manner as to open the throttle fully in a short time, giving the same effect as pushing the accelerator pedal to the floor board. From a dead stop this would be a "jack-rabbit" start, using the foot pedal 58 to engage the system. Double switch foot pedal 58 engages the system in one position and closes the throttle rapidly in the other position which would suffice for normal city driving. Brake application also cuts out system and necessitates resetting foot pedal 58 to engage the system. With reference to Fig. 1 in such a case, foot pedal 58 would be in open position, system disengaged, throttle closed. Indicator 11 would be set at 100 M. P. H., pointing in the general direction of the numeral 22 in the figure, disc 16 would revolve clockwise the same arc degrees and speedometer 15 would revolve counter-clockwise the same arc degrees, indicating that now 100 M. P. H. on speedometer 15 coincides with neutral point 40. Disc 18 with its contacts 40, 42, 43, 44, and 45 remains stationary in position shown in Fig. 1. Speedometer needle 41 is now in a position pointing in the general direction of the numeral 67 in Fig. 1. When circuit is closed by foot pedal 58, the throttle is opened in a short time. Before reaching the desired speed, depending upon desired speed, reset indicator 11 and disengage system by foot pedal 58 until throttle has closed sufficiently to approximate desired speed, then engage system again by foot pedal 58.

Use standard carburetor and valve control. The ignition switch only provides a means for completing the electrical circuit through the use of the car battery.

It will be understood that other modifications may be made in the design and arrangement of parts without departing from the spirit of the invention.

What is claimed is:

1. A speed control unit for a motor vehicle having a carburetor comprising a button actuated indicator, a contact disc having a plurality of contacts thereon, a speedometer having a contact arm extended therefrom, means rotatably mounting the said speedometer with the contact arm thereof positioned to engage the contacts of the contact disc, means rotating the speedometer and contact arm thereof with the pointer of the indicator, means actuating a control valve of the carburetor to correspond with the position of the contact arm of the speedometer, and means breaking circuits to the control valve actuating means for limiting the operation of the said control valve.

2. A speed control unit for a motor vehicle having a carburetor comprising a button actuated indicator, a contact disc having a plurality of contacts thereon, a speedometer having a contact arm extended therefrom, means rotatably mounting the said speedometer with the contact arm thereof positioned to engage the contacts of the contact disc, means rotating the speedometer and contact arm thereof with the pointer of the indicator, means actuating a control valve of the carburetor to correspond with the position of the contact arm and speedometer, and means breaking circuits to the control valve actuating means for limiting the operation of the control valve actuating means.

3. A speed control unit for a motor vehicle having an ignition switch and a carburetor comprising a button actuated indicator, a stationary contact disc having a plurality of contacts thereon, a speedometer having a contact arm extended therefrom, means rotatably mounting the said speedometer with the contact arm thereof positioned to engage the contacts of the contact disc, means rotating the speedometer and contact arm thereof with the pointer of the indicator, means actuating a control valve of the carburetor to correspond with the position of the contact arm and speedometer, means breaking circuits to the control valve actuating means for limiting the operation of the control valve actuating means, and suitable circuits connecting the said contact discs with the control valve actuating means through the ignition switch of the vehicle.

4. A speed control unit for a motor vehicle having an ignition switch and a carburetor comprising a button actuated indicator, a stationary contact disc having a plurality of contacts thereon, a speedometer having a contact arm extended therefrom, means rotatably mounting the said speedometer with the contact arm thereof positioned to engage the contacts of the contact disc, means rotating the speedometer and contact arm thereof with the pointer of the indicator, means actuating a control valve of the carburetor to correspond with the position of the contact arm and speedometer, means varying the speed of the control valve actuating means, means breaking circuits to the control valve actuating means for limiting the operation of the control valve actuating means, and suitable circuits connecting the said contact discs with the control valve actuating means through the ignition switch of the vehicle.

5. In a speed control unit for a motor vehicle having a carburetor, the combination which comprises an indicator having a pointer coacting with a graduated scale showing miles per hour, a button geared to the pointer for manually setting the pointer to desired speed, a speedometer having a contact arm extended from one end thereof, a contact disc having a neutral point with contacts for forward travel on one side of the neutral point and contacts for travel in reverse on the opposite side of said neutral point, means journaling the speedometer with the contact arm thereof positioned to engage the contact points of the contact disc, means rotating the speedometer and contact arm thereof as the pointer of the indicator is actuated by the button, an arm extended from the control means of the carburetor, a motor geared to the arm for actuating the same, means breaking circuits to the motor for limiting the movement of the arm actuating connection with the motor, and a plurality of circuits connecting the contacts of the contact discs to the motor for actuating the arm of the control valve of the carburetor to different positions.

6. In a speed control unit for a motor vehicle having a carbureter, the combination which comprises an indicator having a pointer coacting with a graduated scale showing miles per hour, a button geared to the pointer for manually setting the pointer to desired speed, a speedometer having a contact arm extended from one end thereof, a contact disc having a neutral point with contacts for forward travel on one side of the neutral point and contacts for travel in reverse on the opposite side of said neutral point, means journaling the speedometer with the contact arm thereof positioned to engage the contact points of the contact disc, means rotating the speedometer and contact arm thereof as the pointer of the indicator is actuated by the button, an arm extended from the control means of the carbureter, a motor geared to the arm for actuating the same, means breaking circuits to the motor for limiting the movement of the arm actuating connection with the motor, and a plurality of circuits connecting the contacts of the contact discs to the motor for actuating the arm of the control valve of the carbureter to different positions, said limiting means positioned in the circuits to the motor whereby an operating circuit of the motor is broken by the said limiting means.

LAVERN GEORGE HOENER.

References Cited in the file of this patent

UNITED STATES PATENTS

| Number | Name | Date |
| --- | --- | --- |
| 1,345,539 | Flynn | July 6, 1920 |
| 2,313,505 | Benjamin | Mar. 9, 1943 |
| 2,442,149 | Ruth et al. | May 25, 1948 |